United States Patent

Maruyama et al.

(10) Patent No.: US 12,312,483 B2
(45) Date of Patent: May 27, 2025

(54) INK JET COMPOSITION

(71) Applicant: SEIKO EPSON CORPORATION, Tokyo (JP)

(72) Inventors: Tomoki Maruyama, Matsumoto (JP); Yuji Tabata, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 169 days.

(21) Appl. No.: 18/108,729

(22) Filed: Feb. 13, 2023

(65) Prior Publication Data

US 2023/0257606 A1 Aug. 17, 2023

(30) Foreign Application Priority Data

Feb. 14, 2022 (JP) ................. 2022-020379

(51) Int. Cl.
  *C09D 11/36* (2014.01)
  *C09D 11/38* (2014.01)

(52) U.S. Cl.
  CPC ............. *C09D 11/36* (2013.01); *C09D 11/38* (2013.01)

(58) Field of Classification Search
  CPC ......... C09D 11/36; C09D 11/38; C09D 11/02; B41J 2/14201
  See application file for complete search history.

(56) References Cited

U.S. PATENT DOCUMENTS

| 2020/0101735 A1 | 4/2020 | Okazawa et al. |
| 2020/0180312 A1 | 6/2020 | Tsubota |
| 2021/0252873 A1* | 8/2021 | Ando .................. B41J 2/2117 |

FOREIGN PATENT DOCUMENTS

| CN | 112571962 A | * | 3/2021 | ............... B41J 2/01 |
| JP | 2020-055305 A | | 4/2020 | |
| JP | 2020-093415 A | | 6/2020 | |

OTHER PUBLICATIONS

Ariga, Tomohiro et al., Inkjet Recording Apparatus, Inkjet Recording Method, and Ink Composition (CN 112571962 A), Mar. 3, 20210, [Abstract, 1.1 Ink composition, 1.1.2 Other ingredients] (Year: 2021).*

* cited by examiner

*Primary Examiner* — Lisa Solomon
(74) *Attorney, Agent, or Firm* — Harness, Dickey & Pierce, P.L.C.

(57) ABSTRACT

An ink jet composition according to an embodiment of the present disclosure is an ink jet composition which is ejected from an ink jet head, the ink jet head has a nozzle plate in which nozzles are formed and a flow path substrate which is bonded to one surface of the nozzle plate and in which flow paths including a liquid storage chamber to store a liquid to be supplied to the nozzles are formed, the liquid storage chamber is formed of a recess provided in a surface of the flow path substrate opposite to the nozzle plate, and the ink jet composition has a surface tension of 31 mN/m or less at 25° C.

4 Claims, 1 Drawing Sheet

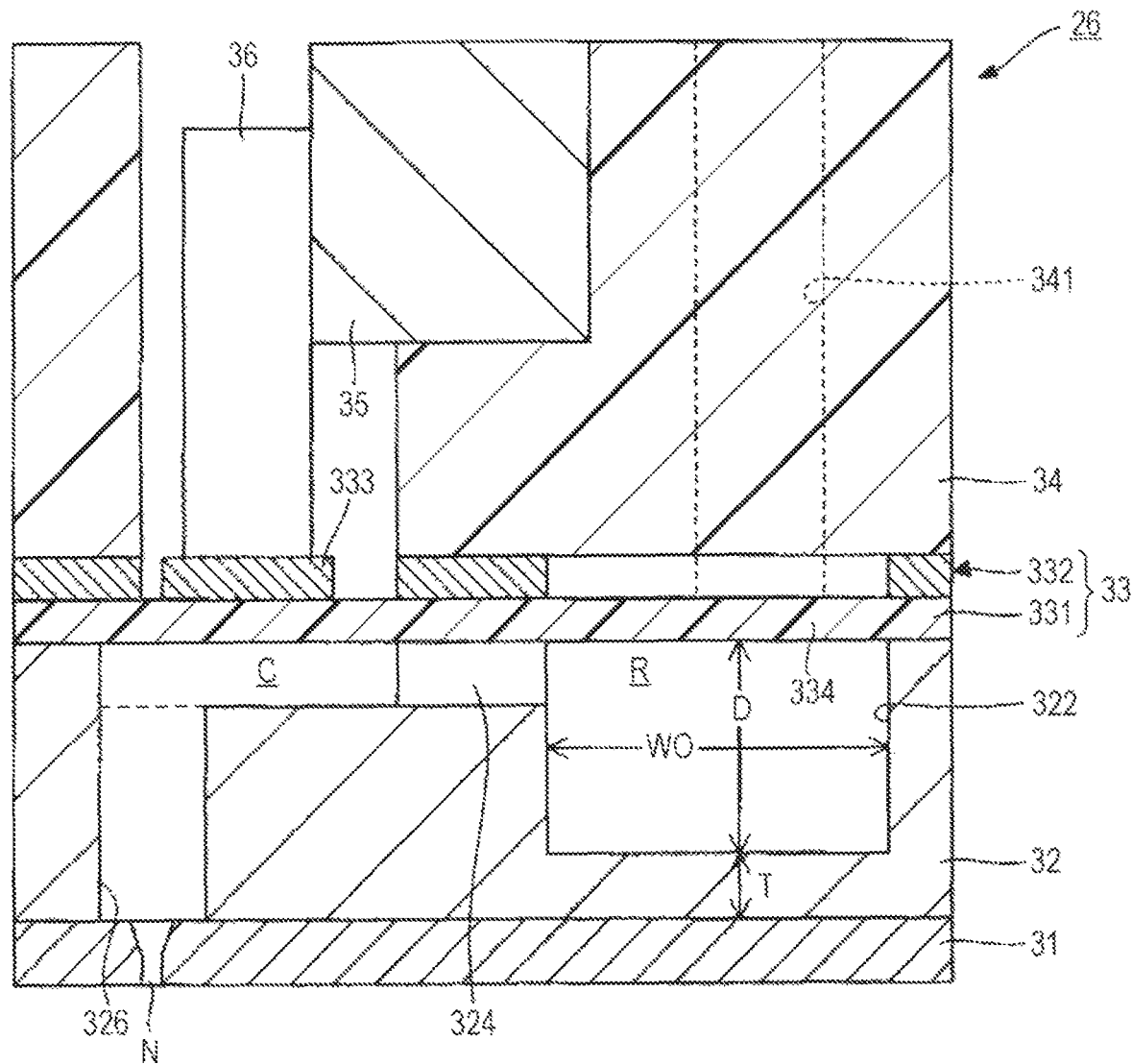

INK JET COMPOSITION

The present application is based on, and claims priority from JP Application Serial Number 2022-020379, filed Feb. 14, 2022, the disclosure of which is hereby incorporated by reference herein in its entirety.

BACKGROUND

1. Technical Field

The present disclosure relates to an ink jet composition.

2. Related Art

A liquid ejecting head to spray an ink in a pressure chamber from a nozzle by changing the volume of the pressure chamber using a piezoelectric element has been known. For example, the head disclosed in JP-A-2020-55305 is a head formed such that a flow path forming member, a communication plate, and a nozzle plate are bonded to each other with an adhesive. However, in the head disclosed in JP-A-2020-55305, since many places at each of which portions bonded to each other with the adhesive are in contact with an ink are present, and the adhesive located at the place described above is attacked by the ink and is swelled therewith, for example, peeling of the nozzle plate occurs, and hence there has been a problem in that the reliably of the head is liable to be degraded.

Accordingly, for example, like the head disclosed in JP-A-2020-93415, when an area from the nozzle plate to a liquid storage chamber is formed as an integrated flow path substrate in which the liquid storage chamber has a recess structure, the places at which the portions bonded with the adhesive are in contact with the ink are limited in the vicinity of the nozzle, and the peeling of the nozzle plate is suppressed, so that the reliability of the head can be improved.

However, since the head to suppress the peeling of the nozzle plate is formed such that the liquid storage chamber has a recess structure, the volume of the liquid storage chamber is decreased as compared to that in the past. As a result, the pressure to push out the ink from the liquid storage chamber to the flow path becomes insufficient, and a problem in that nozzle missing (dot missing) is liable to occur during ink ejection may arise.

SUMMARY

According to an aspect of the present disclosure, there is provided an ink jet composition which is ejected from an ink jet head, the ink jet head has a nozzle plate in which nozzles are formed and a flow path substrate which is bonded to one surface of the nozzle plate and in which flow paths including a liquid storage chamber to store a liquid to be supplied to the nozzles are formed, the liquid storage chamber is formed of a recess provided in a surface of the flow path substrate opposite to the nozzle plate, and the ink jet composition has a surface tension of 31 mN/m or less at 25° C.

BRIEF DESCRIPTION OF THE DRAWINGS

FIGURE is a cross-sectional view of an ink jet head used for an ink jet composition according to this embodiment.

DESCRIPTION OF EXEMPLARY EMBODIMENTS

Hereinafter, embodiments of the present disclosure will be described. The following embodiments are described to explain examples of the present disclosure. The present disclosure is not at all limited to the following embodiments and also includes various modified and/or changed embodiments to be performed without departing from the scope thereof. In addition, all the structures to be described below are not always required to be essential structures of the present disclosure.

1. INK JET COMPOSITION

An ink jet composition according to one embodiment of the present disclosure is an ink jet composition which is ejected from an ink jet head, the ink jet head has a nozzle plate in which nozzles are formed and a flow path substrate which is bonded to one surface of the nozzle plate and in which flow paths including a liquid storage chamber to store a liquid to be supplied to the nozzles are formed, the liquid storage chamber is formed by a recess provided in a surface of the flow path substrate opposite to the nozzle plate, and the ink jet composition has a surface tension of 31 mN/m or less at 25° C.

Since an ink jet head (hereinafter, referred to as "specific ink jet head" in some cases) to be used for the ink jet composition according to this embodiment is formed such that the liquid storage chamber has a recess structure, the volume thereof is liable to be decreased as compared to that of a related liquid storage chamber. Hence, the pressure to push out the ink from the liquid storage chamber to the flow path becomes insufficient, and as a result, nozzle missing is liable to occur during ink ejection.

Accordingly, through intensive research carried out by the present inventor, it was found that even if the ink jet head as described above is used, when the surface tension of the ink jet composition is controlled to a predetermined value or less, the nozzle missing can be preferably suppressed. The reason for this is believed that since the surface tension of the ink jet composition is controlled to a predetermined value or less, the ink is likely to flow along the flow path.

The "ink jet composition" of the present disclosure indicates an ink composition to be ejected by an ink jet method. The "ink jet method" is a recording method which performs recording on a recording medium by ejecting liquid droplets of an ink or the like from a nozzle of an ink jet head of an ink jet recording apparatus or the like. In addition, in this specification, the "ink jet composition" may also be called "ink jet ink composition", "ink composition", or "ink" in some cases.

1.1. Ink Jet Head

The ink jet composition according to this embodiment is an ink jet composition to be ejected from an ink jet head, and the ink jet head has a nozzle plate in which nozzles are formed and a flow path substrate which is bonded to one surface of the nozzle plate and in which flow paths including a liquid storage chamber to store a liquid to be supplied to the nozzles are formed, and the liquid storage chamber is formed by a recess provided in a surface of the flow path substrate opposite to the nozzle plate.

1.1.1. Entire Structure of Ink Jet Head

FIGURE is a cross-sectional view of an ink jet head 26 used for the ink jet composition according to this embodiment. As shown in FIGURE, hereinafter, a direction orthogonal to an X-Y plane is represented by a Z direction. An ink spray direction by the ink jet head 26, that is, typically, the vertical direction, corresponds to the Z direction. In addition, FIGURE is a cross-sectional view parallel to an X-Z plane.

As shown in FIGURE by way of example, the ink jet head 26 has a nozzle plate 31, a flow path substrate 32, a vibration plate 33, a case 34, a fixing member 35, and piezoelectric elements 36. Those described above are bonded to each other with an adhesive or the like. The nozzle plate 31 is bonded to a positive side surface of the flow path substrate 32 in the Z direction, and the vibration plate 33 is bonded to a negative side surface of the flow path substrate 32 in the Z direction. The nozzle plate 31 is a plate-shaped member in which nozzles N are formed so as to be arranged in a Y direction. Each nozzle N is a through-hole through which an ink is allowed to pass. The Y direction may also be called a direction in which the nozzles N are arranged. The nozzle plate 31 is formed, for example, from a metal material, such as stainless steel. For example, the nozzle plate 31 may be manufactured by processing a metal plate by dry etching. In addition, a constitute material and a manufacturing method of the nozzle plate 31 are not particularly limited and may be arbitrarily selected. For example, the nozzle plate 31 may be formed such that a silicone single crystal substrate is processed by a semiconductor manufacturing technique, such as etching.

The flow path substrate 32 is a plate-shaped member to form ink flow paths. As shown in FIGURE by way of example, in the flow path substrate 32, a liquid storage chamber R, a first flow path 324, a pressure chamber C, and a second flow path 326 are formed. The liquid storage chamber R is formed by a recess 322 which is provided in the negative side surface of the flow path substrate 32 in the Z direction. The recess 322 is a concave space provided in the negative side surface of the flow path substrate 32 in the Z direction. The liquid storage chamber R is a continuous common liquid chamber provided for the nozzles N. On the other hand, the first flow path 324, the second flow path 326, and the pressure chamber C are formed for each nozzle N. The pressure chamber C is located between the nozzle plate 31 and the vibration plate 33 and is a space to apply a pressure to an ink filled in the pressure chamber C. The first flow path 324 is a throttle flow path to communicate between the pressure chamber C and the liquid storage chamber R. The first flow path 324 is formed by a recess provided in the negative side surface of the flow path substrate 32 in the Z direction. An ink stored in the liquid storage chamber R is branched by the first flow paths 324 and is then supplied to and filled in the pressure chambers C in a parallel manner. The second flow path 326 is formed by a through-hole to communicate between the pressure chamber C and the nozzle N. The flow path substrate 32 is formed, for example, by processing a silicon (Si) single crystal substrate by a semiconductor manufacturing technique, such as etching.

In the ink jet head used for the ink jet composition according to this embodiment, the first flow path 324 preferably has a cross-sectional area smaller than a cross-sectional area of the second flow path 326. That is, the flow path formed in the flow path substrate 32 includes the first flow path 324 to send the ink jet composition from the liquid storage chamber R and the second flow path 326 to send the ink jet composition from the first flow path 324 to the nozzle N, and the cross-sectional area of the first flow path 324 is preferably smaller than the cross-sectional area of the second flow path 326. When a head having the structure as described above is used, although the backflow of the ink to the liquid storage chamber R can be further suppressed after the ink ejection, a higher pressure to push out the ink from the liquid storage chamber R is required, and as a result, the nozzle missing is more liable to be generated. However, according to the ink jet composition of this embodiment, even when a head in which the first flow path 324 has a reduced cross-sectional area as described above is used, the nozzle missing can be preferably suppressed. In addition, the cross-sectional area of the first flow path 324 is preferably a cross-sectional area viewed in an X direction, and the cross-sectional area of the second flow path 326 is preferably a cross-sectional area viewed in the Z direction. In addition, the X direction and the Z direction are also called the "first direction" and the "second direction", respectively, in some cases.

The vibration plate 33 is formed of an elastic film 331 and a support plate 332. The elastic film 331 is bonded to one surface of the flow path substrate 32, and the support plate 332 is laminated on the elastic film 331. The elastic film 331 is formed, for example, from a resin material, such as a para aramid-based resin. The support plate 332 is formed, for example, from a metal material, such as stainless steel. The support plate 332 has island-shaped portions 333 to be overlapped with the respective pressure chambers C. In addition, the support plate 332 is removed in a region overlapped with the liquid storage chamber R. Hence, in this region, the vibration plate 33 is formed of a single layer of the elastic film 331 and functions as an elastic compliance film 334. The elastic compliance film 334 partially forms a wall surface to mark off the liquid storage chamber R and absorbs the variation in pressure in the liquid storage chamber R.

The case 34 is a structural body manufactured, for example, by injection molding of a resin material and is bonded to one surface of the vibration plate 33 opposite to the flow path substrate 32. As shown in FIGURE by way of example, in the case 34, an inlet port 341 is formed. The inlet port 341 is a through-hole to communicate with the liquid storage chamber R described above. The inlet port 341 introduces the ink in a liquid container (not shown) into the liquid storage chamber R.

The fixing member 35 is a member to fit the piezoelectric element 36 to the case 34 and is fixed to the case 34 by an adhesive or the like. The piezoelectric element 36 is a longitudinal vibration type drive element in which piezoelectric layers and electrode layers (which are not shown) are alternately laminated to each other, and a front portion of the piezoelectric element 36 is in contact with the island-shaped portion 333. In conjunction with deformation of the piezoelectric element 36, when the island-shaped portion 333 is vibrated together with the elastic film 331, the volume of the pressure chamber C is changed, and hence, the ink is sprayed from the nozzle N.

1.1.2. Liquid Storage Chamber

As shown in FIGURE by way of example, the ink jet head 26 has, as described above, the nozzle plate 31 in which the nozzles N are formed and the flow path substrate 32 in which the flow paths including the liquid storage chamber R to store the liquid to be supplied to the nozzles N are formed. In addition, as shown in FIGURE by way of example, the flow path substrate 32 is bonded to one surface of the nozzle plate 31. This bonding is performed, for example, using an adhesive. Although the adhesive is not particularly limited, for example, an epoxy-based adhesive or an urethane-based adhesive may be mentioned. In the adhesive mentioned above, a filler, such as silica or alumina, may be contained.

As shown in FIGURE by way of example, the recess 322 is provided in the surface of the flow path substrate 32 opposite to the nozzle plate 31. By this recess 322, the liquid storage chamber R is formed. As a result, since the adhesive to adhere the flow path substrate 32 to the nozzle plate 31 is not exposed to the liquid in the liquid storage chamber R, no degradation of the adhesive occurs by the liquid described above.

Hereinafter, physical properties of the ink jet composition according to this embodiment and components contained therein will be described.

1.2. Surface Tension of Ink Jet Composition

A surface tension of the ink jet composition according to this embodiment at 25° C. is 31 mN/m or less and is preferably 30.5 mN/m or less, more preferably 30 mN/m or less, even more preferably 29.5 mN/m or less, further preferably 29 mN/m or less, even further preferably 28.5 mN/m or less, particularly preferably 28 mN/m or less, more particularly preferably 27.5 mN/m or less, specifically preferably 27 mN/m or less, and more specifically preferably 26.5 mN/m or less. When the surface tension of the ink jet composition at 25° C. is in the range described above, even if the specific ink jet head is used, the nozzle missing can be preferably suppressed.

In addition, as a measurement method of the surface tension, for example, a method in which the surface tension at a liquid temperature of 25° C. is measured by Wilhelmy method using a generally used surface tension meter (such as a surface tensiometer CBVP-Z manufactured by Kyowa Interface Science Co., Ltd.) may be mentioned.

An adjustment of the surface tension of the ink jet composition is not particularly limited, and for example, the surface tension can be adjusted by controlling the types and the contents of a surfactant and an organic solvent to be contained in the ink.

1.3. Surfactant

The ink jet composition according to this embodiment preferably contains a surfactant. The surfactant is not particularly limited, and for example, an acetylene glycol-based surfactant, a fluorine-based surfactant, or a silicone-based surfactant may be mentioned.

Although the acetylene glycol-based surfactant is not particularly limited, for example, at least one selected from the group consisting of 2,4,7,9-tetramethyl-5-decyne-4,7-diol, an alkylene oxide adduct thereof, 2,4-dimethyl-5-decyne-4-ol, and an alkylene oxide adduct thereof is preferable. A commercially available product of the acetylene glycol-based surfactant is not particularly limited, and for example, there may be mentioned Olfine 104 series or E series, such as Olfine E1010 or E1020 (trade name, manufactured by Air Products Japan, Inc.) or Surfynol 465, Surfynol 61, or Surfynol DF110D (trade name, manufactured by Nisshin Chemical Industry Co., Ltd.).

Although the fluorine-based surfactant is not particularly limited, for example, there may be mentioned a perfluoroalkyl sulfonate salt, a perfluoroalkyl carboxylate salt, a perfluoroalkyl phosphate ester, a perfluoroalkyl ethylene oxide adduct, a perfluoroalkyl betaine, or a perfluoroalkylamine oxide compound. A commercially available product of the fluorine-based surfactant is not particularly limited, and for example, there may be mentioned S-144 or S-145 (manufactured by Asahi Glass Co., Ltd.), FC-170C, FC-430, or Fluorad FC 4430 (manufactured by Sumitomo 3M Limited), FSO, FSO-100, FSN, FSN-100, or FS-300 (manufactured by Dupont), or FT-250 or 251 (manufactured by Neos Co., Ltd.).

As the silicone-based surfactant, for example, a polysiloxane-based compound or a polyether modified organosiloxane may be mentioned. A commercially available product of the silicone-based surfactant is not particularly limited, and for example, there may be mentioned BYK-306, BYK-307, BYK-333, BYK-341, BYK-345, BYK-346, BYK-347, BYK-348, or BYK-349 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

A content of the surfactant with respect to a total mass of the ink jet composition is preferably 0.1 to 5.0 percent by mass, more preferably 0.2 to 3.0 percent by mass, even more preferably 0.3 to 2.0 percent by mass, further preferably 0.4 to 1.5 percent by mass, and particularly preferably 0.5 to 1.3 percent by mass. When the content of the surfactant is in the range described above, the nozzle missing tends to be more preferably suppressed.

The ink jet composition according to this embodiment may contain only one type of surfactant but preferably contains at least two types of surfactants. When at least two types of surfactants are used in combination, compared to the case in which one type of surfactant is only used, the surface tension of the ink can be further decreased, and hence, the nozzle missing tends to be more preferably suppressed.

In particular, at least two types of surfactants having different HLB values are preferably contained. A surfactant having an HLB value of 3 to 8 (hereinafter, also referred to as "surfactant A" in some cases) and a surfactant having an HLB value of 12 to 16 (hereinafter, also referred to as "surfactant B" in some cases) are more preferably contained.

In addition, the HLB value (hydrophile-Lipophile Balance) of the surfactant is a value obtained by calculation using Griffin method. In particular, the HLB value of the surfactant can be calculated by the following equation (H).

$$\text{HLB value} = 20 \times (\text{percent by mass of hydrophilic group}) \tag{H}$$

1.3.1. Surfactant A

The ink jet composition according to this embodiment preferably contains a surfactant (surfactant A) having an HLB value of 3 to 8. The surfactant A has a high hydrophobic property and an excellent defoaming property. Accordingly, bubbles which may be generated on a flow path surface and the like of the ink jet head are suppressed from remaining, growing, and desorbing, and as a result, the nozzle missing can be more preferably suppressed.

The surfactant A is preferably an acetylene glycol-based surfactant having an HLB value of 3 to 8. As the surfactant described above, for example, an alkylene oxide adduct of an acetylene glycol having 10 carbon atoms or more in its main chain may be mentioned. When the surfactant A is an acetylene glycol-based surfactant, since the surfactant A is a nonionic surfactant, the ink is likely to uniformly spread on the head member, and hence, the nozzle missing may be further suppressed in some cases.

The HLB value of the surfactant A is preferably 3 to 6, more preferably 3 to 5, and further preferably 4 to 5. When the HLB value is in the range described above, the defoaming property tends to be made more excellent.

A commercially available product of the surfactant A is not particularly limited, and for example, there may be mentioned Surfynol 61 (HLB value: 6), Surfynol 104S (HLB value: 4), Surfynol 104PG50 (HLB value: 4), Surfynol 420 (HLB value: 4), Surfynol 82 (HLB value: 4), Surfynol DF110D (HLB value: 3), Surfynol MD-20 (HLB value: 4), or Surfynol SE-F (HLB value: 6) (manufactured by Nisshin Chemical Industry Co., Ltd.). Those surfactants may be used alone, or at least two types thereof may be used in combination.

A content of the surfactant A with respect to the total mass of the ink jet composition is preferably 0.01 to 2.0 percent by mass, more preferably 0.05 to 1.5 percent by mass, even more preferably 0.1 to 1.0 percent by mass, further preferably 0.15 to 0.7 percent by mass, and particularly preferably 0.2 to 0.4 percent by mass. When the content of the surfactant A is in the range described above, the nozzle missing tends to be more preferably suppressed.

1.3.2 Surfactant B

The ink jet composition according to this embodiment preferably contains a surfactant (surfactant B) having an HLB value of 12 to 16. The surfactant B has a high hydrophilic property and an excellent wettability. Accordingly, an ink containing the surfactant B is likely to wet-spread on the ink jet head member, and the nozzle missing tends to not occur.

From the same point as that of the surfactant A described above, the surfactant B is preferably an acetylene glycol-based surfactant having an HLB value of 12 to 16. The HLB value of the surfactant B is preferably 12 to 15, more preferably 12 to 14, and further preferably 13 to 14. When the HLB value is in the range described above, the wettability tends to be made more excellent. In addition, when at least two types of surfactants B are used in combination, the HLB value thereof can be obtained by the weighted average.

A commercially available product of the surfactant B is not particularly limited, and for example, Olfine 104 Series or E series, such as Olfine E1010 (HLB value: 13) or Olfine E1020 (HLB value: 15 to 16) (manufactured by Nisshin Chemical Industry Co., Ltd.), or Newcol 1006 (HLB value: 13.4) or Newcol 1008 (HLB value: 14.6) (manufactured by Nippon Nyukazai Co., Ltd.) may be mentioned. Those surfactants may be used alone, or at least two types thereof may be used in combination.

A content of the surfactant B with respect to the total mass of the ink jet composition is preferably 0.1 to 2.0 percent by mass, more preferably 0.2 to 1.5 percent by mass, further preferably 0.3 to 1.0 percent by mass, and particularly preferably 0.4 to 0.7 percent by mass. When the content of the surfactant B is in the range described above, the nozzle missing tends to be more preferably suppressed.

1.3.3. Content Ratio

In the ink jet composition according to this embodiment, when the content of the surfactant B with respect to the total mass of the ink jet composition is represented by $M_B$, and the content of the surfactant A with respect to the total mass of the ink jet composition is represented by $M_A$, a content ratio ($M_B/M_A$) is preferably 1.5 to 4.0, more preferably 1.5 to 3.5, even more preferably 1.5 to 3.0, further preferably 1.7 to 2.5, and particularly preferably 1.8 to 2.2. Since having a relatively high hydrophobic property, the surfactant A is liable to be adsorbed to the adhesive used for the head, and as a result, the peeling of the nozzle plate may occur in some cases. On the other hand, since the surfactant B has a relatively high hydrophilic property, the problem described above is not likely to occur. Hence, when the content ratio ($M_B/M_A$) is in the range described above, the nozzle missing can be preferably suppressed, and in addition, the peeling of the nozzle plate also tends to be suppressed.

1.4. Organic Solvent

The ink jet composition according to this embodiment may also contain an organic solvent. As the organic solvent, a water-soluble organic solvent is more preferable. In addition, the "water-soluble" organic solvent indicates an organic solvent having a solubility of 0.1 g or more with respect to 100 g of water at 20° C.

As the water-soluble organic solvent, for example, there may be mentioned an ester, an alkylene glycol ether, a cyclic ester, a nitrogen-containing solvent, an alcohol, or a polyvalent alcohol. As the nitrogen-containing solvent, for example, a cyclic amide or an acyclic amide may be mentioned. As the acyclic amide, for example, an alkoxyalkylamide may be mentioned.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

As the alkylene glycol ether, a monoether or a diether of an alkylene glycol may be used, and an alkyl ether is preferable. As a concrete example thereof, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether (TEGmBE), tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone; or a compound in which a hydrogen atom of a methylene group adjacent to a carbonyl group of one of those mentioned above is replaced by an alkyl group having 1 to 4 carbon atoms.

As the alkoxyalkylamide, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-prooxy-N,N-methylethylpropionamide, 3-iso-propoxy-N,N-dimethylpropionamide, 3-iso-propoxy-N,N-diethylpropionamide, 3-iso-prooxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

As the cyclic amide, a lactam may be mentioned, and for example, there may be mentioned a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone.

As the alcohol, for example, a compound in which one hydrogen atom of an alkane is replaced by a hydroxy group may be mentioned. As the alkane, an alkane having 10 carbon atoms or less is preferable, an alkane having 6 carbon atoms or less is more preferable, and an alkane having 3 carbon atoms or less is further preferable. The number of carbon atoms of the alkane is 1 or more and preferably 2 or more. The alkane may be linear or branched. As the alcohol, for example, methanol, ethanol, n-propyl alcohol, iso-propyl alcohol, n-butanol, 2-butanol, tert-butanol, iso-butanol, n-pentanol, 2-pentanol, 3-pentanol, or tert-pentanol may be mentioned.

The polyvalent alcohol is a compound having at least two hydroxy groups in its molecule. The polyvalent alcohol may be classified, for example, into an alkanediol and a polyol.

As the alkanediol, for example, a compound in which an alkane is replaced by two hydroxy groups may be mentioned. As the alkanediol, for example, there may be mentioned ethylene glycol (alias: ethane-1,2-diol), propylene glycol (alias: propane-1,2-diol), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, or 2-methyl-2-propyl-1,3-propanediol.

As the polyol, for example, a condensate in which at least two alkanediol molecules are intermolecular condensed between hydroxy groups or a compound having at least three hydroxy groups may be mentioned.

As the condensate in which at least two alkanediol molecules are intermolecular condensed between hydroxy groups, for example, there may be mentioned a dialkylene glycol, such as diethylene glycol or dipropylene glycol, or a trialkylene glycol, such as triethylene glycol (standard boiling point: 287.4° C.) or tripropylene glycol.

The compound having at least three hydroxy groups is a compound which has an alkane structure or a polyether structure as a skeleton and at least three hydroxy groups. As the compound having at least three hydroxy groups, for example, glycerin (standard boiling point: 290° C.), trimethylolethane, trimethylolpropane, 1,2,5-hexanetriol, 1,2,6-hexanetriol, pentaerythritol, or a polyoxypropylene triol may be mentioned.

The alkanediol and the polyol are each able to function primarily as a penetrating solvent and/or a moisture retaining solvent. In addition, the alkanediol primarily tends to function as a penetrating solvent, and the polyol primarily tends to function as a moisture retaining solvent.

The organic solvent may be used alone, or at least two types thereof may be used in combination.

The ink jet composition according to this embodiment preferably contains a polyvalent alcohol having a standard boiling point of 270° C. or more. Since the polyvalent alcohol having a standard boiling point of 270° C. or more is particularly excellent in moisture retaining property, the moisture retaining property of the ink is improved, and hence, a clogging recovery property tends to be made more excellent. The standard boiling point of the polyvalent alcohol is more preferably 275° C. or more, further preferably 280° C. or more, and particularly preferably 285° C. or more.

As the polyvalent alcohol having a standard boiling point of 270° C. or more, for example, glycerin (standard boiling point: 290° C.), triethylene glycol (standard boiling point: 287.4° C.), or tripropylene glycol (standard boiling point: 270° C.) may be mentioned. Among those mentioned above, at least one selected from glycerin and triethylene glycol is preferable.

A content of the polyvalent alcohol having a standard boiling point of 270° C. or more with respect to the total mass of the ink jet composition is preferably 1 to 30 percent by mass, more preferably 5 to 25 percent by mass, even more preferably 10 to 20 percent by mass, further preferably 12 to 18 percent by mass, and particularly preferably 13 to 16 percent by mass. When the content of the polyvalent alcohol having a standard boiling point of 270° C. or more is in the range described above, the clogging recovery property tends to be made more excellent.

Although a content of the organic solvent is not particularly limited, the content described above with respect to the total mass of the ink jet composition is preferably 1 percent by mass or more, more preferably 5 percent by mass or more, even more preferably 10 percent by mass or more, further preferably 15 percent by mass or more, and particularly preferably 20 percent by mass or more. Although an upper limit of the content described above is not particularly limited, the upper limit described above with respect to the total mass of the ink jet composition is preferably 50 percent by mass or less, more preferably 40 percent by mass or less, even more preferably 35 percent by mass or less, and further preferably 30 percent by mass or less. When the content of the organic solvent is in the range described above, the clogging recovery property may be made excellent in some cases.

1.5. Water

The ink jet composition according to this embodiment may contain water. Although the water is not particularly limited, for example, pure water, such as ion exchange water, ultrafiltration water, reverse osmosis water, or distilled water, or water, such as ultrapure water, in which ionic impurities are removed as much as possible may be mentioned. In addition, in the case in which water sterilized by ultraviolet radiation, addition of hydrogen peroxide, or the like is used, generation of fungi and bacteria can be prevented when the ink jet composition is stored for a long time. As a result, a storage stability tends to be further improved.

A content of the water with respect to the total mass of the ink jet composition is preferably 50 percent by mass or more, more preferably 55 percent by mass or more, further preferably 60 percent by mass or more, and particularly preferably 65 percent by mass or more. In addition, although an upper limit of the content of the water is not particularly limited, the upper limit described above with respect to the total mass of the ink jet composition is preferably 90 percent by mass or less and more preferably 80 percent by mass or less.

1.6. Colorant

A colorant is not particularly limited, and for example, a dye or a pigment may be mentioned. As the dye, for example, a water-soluble dye, a disperse dye, or an oil dye may be mentioned.

As the water-soluble dye, for example, there may be mentioned an acid dye, such as C.I. Acid Yellow 1, 3, 6, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219, 219:1, 220, 230, 232, 235, 241, 242, or 246, C.I. Acid Orange 3, 7, 8, 10, 19, 22, 24, 51, 51S, 56, 67, 74, 80, 86, 87, 88, 89, 94, 95, 107, 108, 116, 122, 127, 140, 142, 144, 149, 152, 156, 162, 166, or 168, C.I. Acid Red 1, 6, 8, 9, 13, 18, 27, 35, 37, 52, 54, 57, 60, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, or 415, C.I. Acid Violet 17, 19, 21, 42, 43, 47, 48, 49, 54, 66, 78, 90, 97, 102, 109, or 126, C.I. Acid Blue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, or 350, C.I. Acid Green 9, 12, 16, 19, 20, 25, 27, 28, 40, 43, 56, 73, 81, 84, 104, 108, or 109, C.I. Acid Brown 2, 4, 13, 14, 19, 28, 44, 123, 224, 226, 227, 248, 282, 283, 289, 294, 297, 298, 301, 355, 357, or 413, or C.I. Acid Black 1, 2, 3, 24, 24:1, 26, 31, 50, 52, 52:1, 58, 60, 63, 63S, 107, 109, 112, 119, 132, 140, 155, 172, 187, 188, 194, 207, or 222; a direct dye, such as C.I. Direct Yellow 8, 9, 10, 11, 12, 22, 27, 28, 39, 44, 50, 58, 86, 87, 98, 105, 106, 130, 137, 142, 147, or 153, C.I. Direct Orange 6, 26, 27, 34, 39, 40, 46, 102, 105, 107, or 118, C.I. Direct Red 2, 4, 9, 23, 24, 31, 54, 62, 69, 79, 80, 81, 83, 84, 89, 95, 212, 224, 225, 226, 227, 239, 242, 243, or 254, C.I. Direct Violet 9, 35, 51, 66, 94, or 95, C.I. Direct Blue 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, or 291, C.I. Direct Green 26, 28, 59, 80, or 85, C.I. Direct Brown 44, 44:1, 106, 115, 195, 209, 210, 212:1, 222, or 223, or C.I. Direct Black 17, 19, 22, 32, 51, 62, 108, 112, 113, 117, 118, 132, 146, 154, 159, or 169; or a reactive dye, such as C.I. Reactive Yellow 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, or 176, C.I. Reactive Orange 1, 4, 5, 7, 11, 12, 13, 15, 16, 20, 30, 35, 56, 64, 67, 69, 70, 72, 74, 82, 84, 86, 87, 91, 92, 93, 95, or 107, C.I. Reactive Red 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, or 235, C.I. Reactive Violet 1, 2, 4, 5, 6, 22, 23, 33, 36, or 38, C.I. Reactive Blue 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, or 236, C.I. Reactive Green 8, 12, 15, 19, or 21, C.I. Reactive Brown 2, 7, 9, 10, 11, 17, 18, 19, 21, 23, 31, 37, 43, or 46, or C.I. Reactive Black 5, 8, 13, 14, 31, 34, or 39.

As the disperse dye, for example, there may be mentioned C.I. Disperse Yellow 5, 42, 54, 64, 79, 82, 83, 93, 99, 100, 119, 122, 124, 126, 160, 184:1, 186, 198, 199, 204, 224, or 237; C.I. Disperse Orange 13, 29, 31:1, 33, 49, 54, 55, 66, 73, 118, 119, or 163, C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, or 362, C.I. Disperse Orange 33, C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, or 368, or C.I. Disperse Green 6:1 or 9.

As the oil dye, for example, there may be mentioned C.I. Solvent Black 3, 7, 27, 29, or 34, C.I. Solvent Yellow 14, 16, 19, 29, 56, or 82, C.I. Solvent Red 1, 3, 8, 18, 24, 27, 43, 51, 72, 73, 132, or 218, C.I. Solvent Violet 3, C.I. Solvent Blue 2, 11, or 70, C.I. Solvent Green 3 or 7, or C.I. Solvent Orange 2.

As the pigment, various types of organic and inorganic pigments may be used. For example, there may be mentioned an azo pigment, such as an azo lake, an insoluble azo pigment, a condensed azo pigment, or a chelate azo pigment; a polycyclic pigment, such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment; a dye lake, such as a basic dye lake or an acidic dye lake; an organic pigment, such as a nitro pigment, a nitroso pigment, an aniline black, or a daylight fluorescent pigment; or an inorganic pigment, such as a carbon black.

Although a content of the colorant may be appropriately adjusted in accordance with applications, the content described above with respect to the total mass of the ink jet composition is preferably 0.1 to 17.0 percent by mass, more preferably 0.2 to 15.0 percent by mass, further preferably 1.0 to 10.0 percent by mass, and particularly preferably 2.0 to 5.0 percent by mass. When the content of the colorant is in the range described above, an ejection performance of the head may be made more excellent in some cases.

1.7. pH Adjuster

The ink jet composition according to this embodiment may contain a pH adjuster. The pH adjuster is not particularly limited, and for example, an organic base or an inorganic base may be mentioned. As the organic base, for example, an alkanolamine, such as triethanolamine, diethanolamine, monoethanolamine, or tri-iso-propanolamine, may be mentioned. As the inorganic base, for example, a strong base, such as lithium hydroxide, potassium hydroxide, or calcium hydroxide, which is a hydroxide of an alkali metal or an alkaline earth metal, may be used.

When the pH adjuster is contained in the ink jet composition, the content thereof with respect to the total mass of the ink jet composition is preferably 0.01 to 1.0 percent by mass, more preferably 0.03 to 0.5 percent by mass, further preferably 0.05 to 0.3 percent by mass, and particularly preferably 0.07 to 0.15 percent by mass. When the content of the pH adjuster is in the range described above, a dispersion stability of the colorant is improved, and the ejection performance of the head may be made more excellent in some cases.

1.8. Other Components

In the ink jet composition according to this embodiment, besides the components described above, various types of additives, such as a resin, a dispersant, an antiseptic agent/ fungicide, a chelating agent, a wax, a softener, a solubilizing agent, a viscosity adjuster, and/or an antioxidant, may also be appropriately contained.

2. EXAMPLES

Hereinafter, although the present disclosure will be described in more detail with reference to Examples, the present disclosure is not limited thereto. Hereinafter, unless otherwise particularly described, "%" is on a mass basis.

2.1. Preparation of Ink Jet Composition

After components were charged in a container to have one of the compositions shown in the following Table 1, mixing and stirring were performed using a magnetic stirrer for 2 hours, and the components described above were further sufficiently mixed together by a dispersion treatment using a bead mill in which zirconia beads having a diameter of 0.3 mm were filled. After the components were stirred for one hour, filtration was performed using a 5-μm PTFE-made membrane filter, so that an ink jet composition of each of Examples and Comparative Examples was obtained. In addition, pure water was added so that the total mass of the ink jet composition was 100 percent by mass.

TABLE 1

| COMPOSITION | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| INK JET HEAD | HEAD STRUCTURE | X | X | X | X | X | X | X |
| | PRESENCE OF SPECIFIC STRUCTURE | YES | YES | YES | YES | YES | YES | YES |
| COLORANT | DB199 | 4 | 4 | 4 | 4 | 4 | 4 | 4 |
| SURFACTANT A | SURYNOL DF110D (HLB:3) | 0.2 | 0.4 | 0.2 | | | | 0.2 |
| | SURYNOL 104PG50 (HLB:4) | 0.4 | 0.4 | 0.6 | 0.2 | 2 | | 0.4 |
| SURFACTANT B | SURYNOL SEF (HLB:6) | | | | | | | 0.4 |
| | OLFINE E1010 (HLB:13) | | | | 0.8 | | | 3 |
| | OLFINE E1020 (HLB:15-16) | | | | | | 2 | 2 |
| POLYVALENT ALCOHOL HAVING STANDARD BOILING POINT OF 270° C. OR MORE | GLYCERIN (290° C.) | 10 | 10 | 10 | 10 | 10 | 10 | 20 |
| | TRIETHYLENE GLYCOL (287.4° C.) | 5 | 5 | 5 | 5 | 5 | 5 | 1 |
| | TEGmBE | 10 | 10 | 10 | 10 | 10 | 10 | |
| | 1,2HEXANEDIOL | 1 | 1 | 1 | 1 | 1 | 1 | |
| | TRITHAANOLAMINE | 0.1 | 0.1 | 0.1 | 0.1 | 0.1 | 0.1 | 0.1 |
| | PURE WATER | BALANCE | BALANCE | BALANCE | BALANCE | BALANCE | BALANCE | BALANCE |
| SURFACE TENSION OF INK | | 28 | 26 | 28 | 27 | 29 | 29 | 28 |
| SURFACTANT B/SURFACTANT A | | 2 | 1 | 3 | 4 | 0 | — | 2 |
| EVALUATION RESULTS | NP PEELING (ATTACK ON HEAD) | A | A | B | B | B | B | A |
| | DOT MISSING | A | A | A | A | A | A | A |
| | CLOGGING RECOVERY PROPERTY | A | A | A | A | A | A | B |

| COMPOSITION | | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 |
|---|---|---|---|---|---|---|---|
| INK JET HEAD | HEAD STRUCTURE | X | X | X | Y | Y | X |
| | PRESENCE OF SPECIFIC STRUCTURE | YES | YES | YES | NO | NO | YES |
| COLORANT | DB199 | 4 | 4 | 4 | 4 | 4 | 4 |
| SURFACTANT A | SURYNOL DF110D (HLB:3) | 0.3 | 0.3 | | | | |
| | SURYNOL 104PG50 (HLB:4) | | | 0.3 | 0.1 | 0.2 | 0.1 |
| SURFACTANT B | SURYNOL SEF (HLB:6) | | | 0.8 | | | |
| | OLFINE E1010 (HLB:13) | | 0.8 | | 0.1 | 0.5 | 0.1 |
| | OLFINE E1020 (HLB:15-16) | 0.8 | | | | | |
| POLYVALENT ALCOHOL HAVING STANDARD BOILING POINT OF 270° C. OR MORE | GLYCERIN (290° C.) | 10 | 10 | 10 | 10 | 9 | 10 |
| | TRIETHYLENE GLYCOL (287.4° C.) | 5 | 5 | 5 | 5 | 5 | 5 |
| | TEGmBE | 10 | 10 | 10 | 10 | 10 | 10 |
| | 1,2HEXANEDIOL | 1 | 1 | 1 | 1 | 1 | 1 |
| | TRITHAANOLAMINE | 0.1 | 0.1 | 0.1 | 0.1 | 0.1 | 0.1 |
| | PURE WATER | BALANCE | BALANCE | BALANCE | BALANCE | BALANCE | BALANCE |
| SURFACE TENSION OF INK | | 27 | 30 | 30 | 38 | 28 | 38 |
| SURFACTANT B/SURFACTANT A | | 2.7 | 2.7 | 2.7 | 1 | 2.5 | 1 |
| EVALUATION RESULTS | NP PEELING (ATTACK ON HEAD) | B | B | B | C | C | A |

TABLE 1-continued

| DOT MISSING CLOGGING RECOVERY PROPERTY | A | A | A | A | C | A | A | C |
|---|---|---|---|---|---|---|---|---|
| | A | A | A | A | A | A | A | A |

The above Table 1 will be further additionally explained.
<Ink Jet Head>
"X" in the above table indicates the ink jet head shown in FIGURE. In addition, "Y" in the above table indicates an ink jet head shown in FIG. 10 of JP-A-2020-55305.

"SPECIFIC STRUCTURE" indicates the structure of an ink jet head having a nozzle plate in which nozzles are formed and a flow path substrate which is bonded to one surface of the nozzle plate and in which flow paths including a liquid storage chamber to store a liquid to be supplied to the nozzles are formed, and in this structure, the liquid storage chamber is formed by a recess provided in a surface of the flow path substrate opposite to the nozzle plate.
<Ink Component>
[Colorant]
  DB199 (C.I. Direct Blue 199)
[Surfactant]
  Surfynol DF110D (trade name, manufactured by Nisshin Chemical Industry Co., Ltd., acetylene glycol-based surfactant)
  Surfynol 104PG50 (trade name, manufactured by Nisshin Chemical Industry Co., Ltd., acetylene glycol-based surfactant)
  Surfynol SE-F (trade name, manufactured by Nisshin Chemical Industry Co., Ltd., acetylene glycol-based surfactant)
  Olfine E1010 (trade name, manufactured by Air Products Japan, Inc., acetylene glycol-based surfactant)
  Olfine E1020 (trade name, manufactured by Air Products Japan, Inc., acetylene glycol-based surfactant)
[Other]
  TEGmBE (triethylene glycol monobutyl ether)
<Surface Tension>
The surface tension of the ink was measured by confirming a surface tension when a platinum plate was wetted with the ink in an environment at a temperature of 25° C. using an automatic surface tensiometer CBVP-Z (trade name, manufactured by Kyowa Interface Science Co., Ltd.).

2.2. Evaluation Method 2.2.1. NP (Nozzle Plate) Peeling (Attack on Head)

In the ink jet composition thus obtained, the ink jet head X or the ink jet head Y was immersed and then left at 80° C. fro 65 hours, and subsequently, the degree of adhesive peeling was observed by visual inspection and was then evaluated by the following evaluation criteria.
Evaluation Criteria
A: no ink penetration to adhesive is observed.
B: slight ink intrusion is observed in a portion, such as a corner, having a wide contact area.
C: ink intrusion is entirely observed.

2.2.2. Dot Missing

In a modified ink jet printer (trade name "PX-G930", manufactured by Seiko Epson Corporation) modified to have the ink jet head shown in the above Table 1, the ink jet composition obtained as described above was filled, and after 3,000 sheets were continuously printed thereby, the evaluation was performed by the following evaluation criteria.
Evaluation Criteria
A: No dot missing occurs during printing on 3,000 sheets.
B: Although dot missing occurs during printing on 3,000 sheets, dot missing is recovered by CL (cleaning), and subsequently, printing can be performed without causing problems.
C: Dot missing occurs during printing on 3,000 sheets, and although dot missing is temporarily recovered by CL (cleaning), dot missing again occurs.

2.2.3. Clogging Recovery Property

In a modified ink jet printer (trade name "PX-G930", manufactured by Seiko Epson Corporation) modified to have the ink jet head shown in the above Table 1, the ink jet composition obtained as described above was filled, and in an environment at a temperature of 40° C. and a humidity of 25%, the ink jet composition was left for 7 days while a cap of an ink cartridge was opened. Subsequently, printing of a nozzle check pattern and cleaning (CL) were repeatedly performed, and the evaluation was performed by the following evaluation criteria.
Evaluation Criteria
A: All nozzles are recovered by 3 cleanings (CL) or less.
B: All nozzles are recovered by 4 cleanings (CL) or more.

2.3. Evaluation Results

Evaluation results are show in the above Table 1.

In each Example in which the ink jet composition is an ink jet composition to be ejected from an ink jet head, the ink jet head has a nozzle plate in which nozzles are formed and a flow path substrate which is bonded to one surface of the nozzle plate and in which flow paths including a liquid storage chamber to store a liquid to be supplied to the nozzles are formed, the liquid storage chamber is formed of a recess provided in a surface of the flow path substrate opposite to the nozzle plate, and the ink jet composition has a surface tension of 31 mN/m or less at 25° C., as shown in the above Table 1, both the nozzle plate peeling and the nozzle missing can be preferably suppressed.

By comparison between each Example and Comparative Examples 1 and 2, since the ink jet head having a specific structure is used, the nozzle plate peeling can be preferably suppressed.

By comparison between each Example and Comparative Example 3, since the surface tension of the ink is 31 mN/m or less, the generation of the nozzle missing can be preferably suppressed.

From the embodiments described above, the following conclusions can be obtained.

An ink jet composition according to one aspect of the present disclosure an ink jet composition which is ejected from an ink jet head, the ink jet head has a nozzle plate in which nozzles are formed and a flow path substrate which is bonded to one surface of the nozzle plate and in which flow paths including a liquid storage chamber to store a liquid to be supplied to the nozzles are formed, the liquid storage chamber is formed of a recess provided in a surface of the flow path substrate opposite to the nozzle plate, and the ink jet composition has a surface tension of 31 mN/m or less at 25° C.

The ink jet composition of the aspect described above may contain at least two types of surfactants.

In the ink jet composition of any one of the above aspects, the surfactants may include a surfactant A having an HLB value of 3 to 8.

In the ink jet composition of any one of the above aspects, the surfactants may include a surfactant B having an HLB value of 12 to 16.

In the ink jet composition of any one of the above aspects, when a content of the surfactant B with respect to a total mass of the ink jet composition and a content of the surfactant A with respect to the total mass of the ink jet composition are represented by $M_B$ and $M_A$, respectively, a content ratio ($M_B/M_A$) may be 1.5 to 4.0.

The ink jet composition of any one of the above aspects may contain a polyvalent alcohol having a standard boiling point of 270° C. or more.

In the ink jet composition of any one of the above aspects, the flow paths each may include a first flow path to send the ink jet composition from the liquid storage chamber and a second flow path to send the ink jet composition from the first flow path to the nozzle, and the first flow path may have a cross-sectional area smaller than a cross-sectional area of the second flow path.

The present disclosure is not limited to the embodiments described above and may be variously changed and/or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. An ink jet composition which is ejected from an ink jet head,
    wherein the ink jet head has:
    a nozzle plate in which nozzles are formed; and
    a flow path substrate which is bonded to one surface of the nozzle plate and in which flow paths including a liquid storage chamber to store a liquid to be supplied to the nozzles are formed,
    the liquid storage chamber is formed of a recess provided in a surface of the flow path substrate opposite to the nozzle plate,
    the ink jet composition has a surface tension of 31 mN/m or less at 25° C.
    the ink jet composition includes at least two types of surfactants including a surfactant A and a surfactant B,
    the surfactant B has an HLB value of 12 to 16, and
    when a content of the surfactant B with respect to a total mass of the ink jet composition and a content of the surfactant A with respect to the total mass of the ink jet composition are represented by $M_B$ and $M_A$, respectively, a content ratio ($M_B/M_A$) is 1.5 to 4.0.

2. The ink jet composition according to claim 1, wherein the surfactant A has an HLB value of 3 to 8.

3. The ink jet composition according to claim 1, which contains a polyvalent alcohol having a standard boiling point of 270° C. or more.

4. The ink jet composition according to claim 1,
    wherein the flow paths each include a first flow path to send the ink jet composition from the liquid storage chamber and a second flow path to send the ink jet composition from the first flow path to the nozzle, and
    the first flow path has a cross-sectional area smaller than a cross-sectional area of the second flow path.

* * * * *